No. 831,289. PATENTED SEPT. 18, 1906.
T. M. LEDBETTER.
PLANTER AND FERTILIZER DISTRIBUTER.
APPLICATION FILED APR. 18, 1906.

2 SHEETS—SHEET 1.

Witnesses
Inventor
T. M. Ledbetter
By
Lacey, Attorneys

No. 831,289. PATENTED SEPT. 18, 1906.
T. M. LEDBETTER.
PLANTER AND FERTILIZER DISTRIBUTER.
APPLICATION FILED APR. 18, 1906.

2 SHEETS—SHEET 2.

Inventor
T. M. Ledbetter

Witnesses

By
Attorneys

UNITED STATES PATENT OFFICE.

THOMAS M. LEDBETTER, OF LITTLES MILLS, NORTH CAROLINA.

PLANTER AND FERTILIZER-DISTRIBUTER.

No. 831,289.   Specification of Letters Patent.   Patented Sept. 18, 1906.

Application filed April 18, 1906. Serial No. 312,475.

*To all whom it may concern:*

Be it known that I, THOMAS M. LEDBETTER, a citizen of the United States, residing at Littles Mills, in the county of Richmond and State of North Carolina, have invented certain new and useful Improvements in Planters and Fertilizer-Distributers, of which the following is a specification.

This invention embodies an improved agricultural implement in the form of a combined planter and fertilizer-distributer, the essential features of the invention residing in the special construction of the parts and arrangement thereof and in other details of structure the advantages of which will appear more fully hereinafter and which will be finally claimed.

For a full understanding of the invention and the merits thereof and also to acquire a knowledge of the details of construction of the means for effecting the result reference is to be had to the following description and accompanying drawings, in which—

Figure 1:
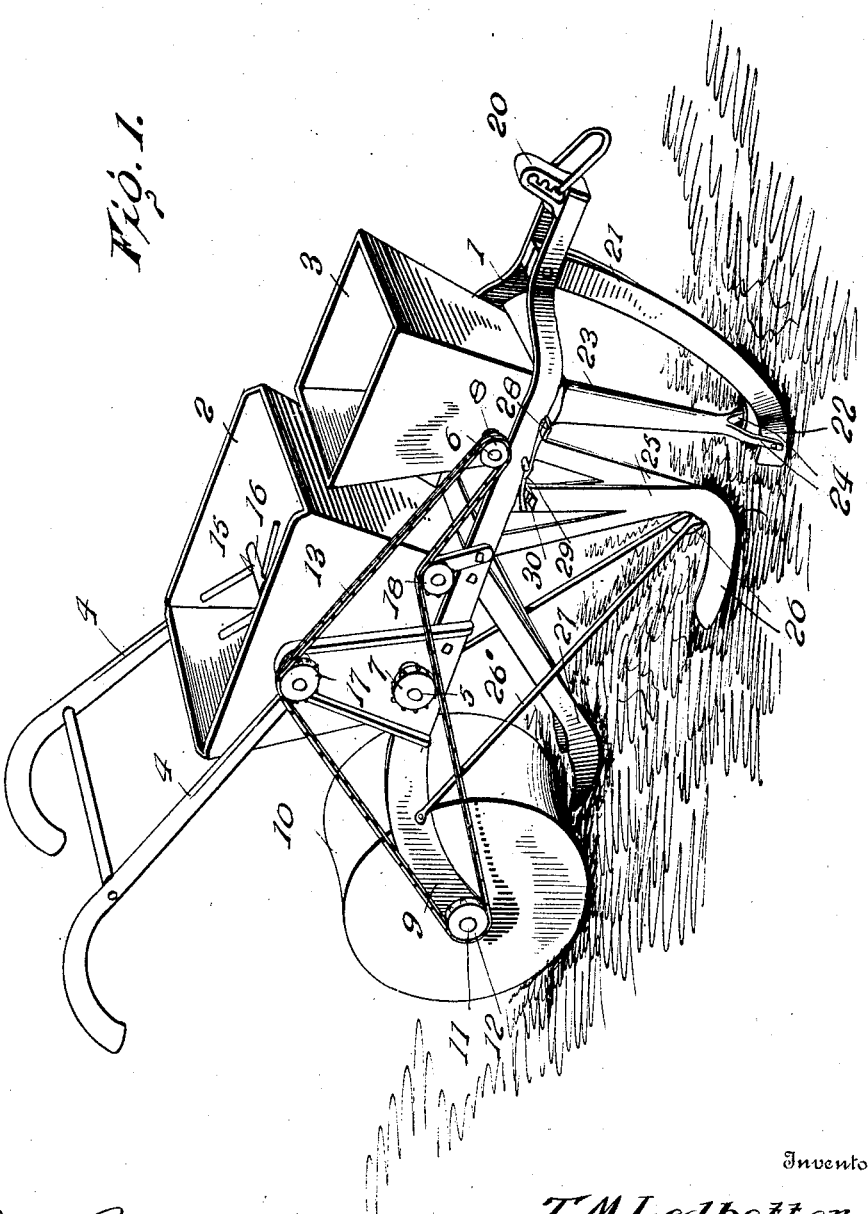
Figure 2:
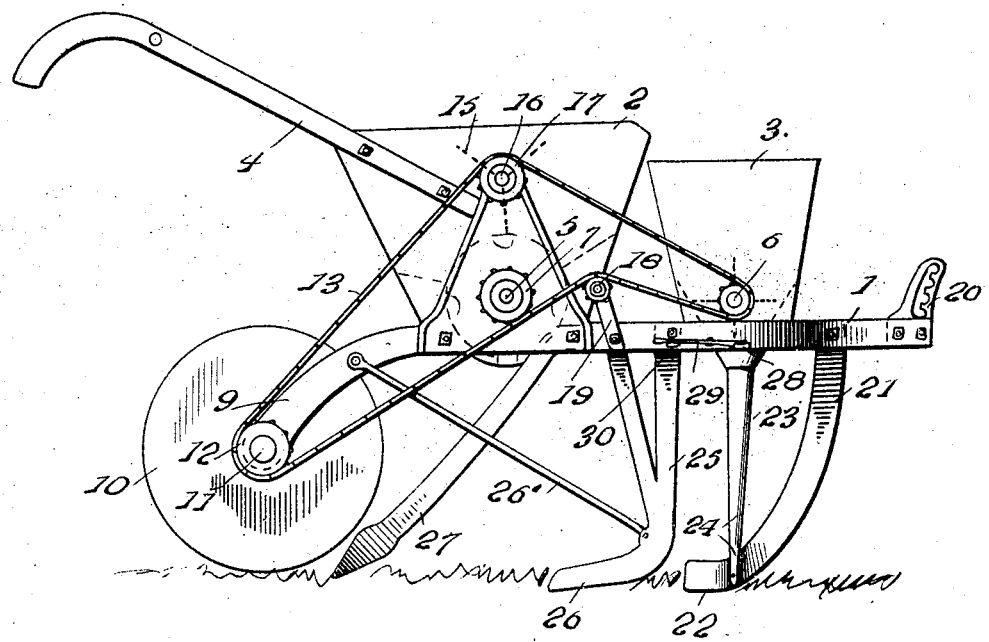
Figure 3:
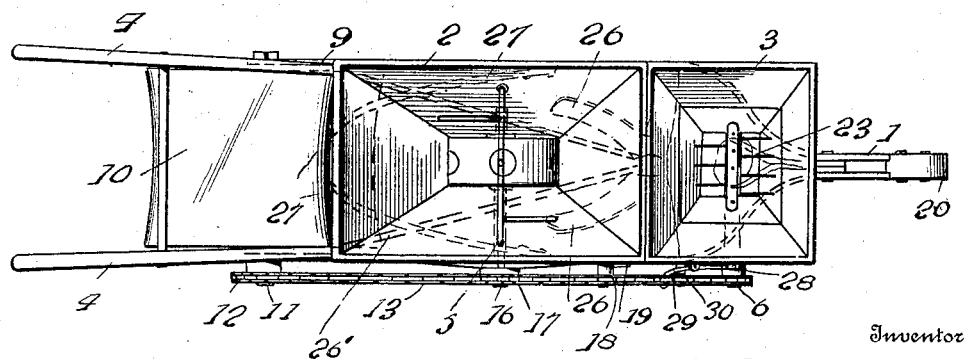

Figure 1 is a perspective view of an implement embodying the invention. Fig. 2 is a side elevation. Fig. 3 is a top plan view.

Corresponding and like parts are referred to in the following description and indicated in all the views of the drawings by the same reference characters.

The invention consists, primarily, of a suitable horizontal supporting-frame 1, upon the rear end portion of which is arranged the seed-hopper 2, in advance of which is located the fertilizer-hopper 3, both carried by said frame. Suitable handles 4 are attached to the seed-hopper 2, and said hoppers will be provided in the lower portions thereof with any conventional and approved type of dropping mechanism, including an operating-shaft 5 for such mechanism in the seed-hopper 2 and a similar shaft 6 for corresponding mechanism in the hopper 3. The shafts 5 and 6 will be projected from the sides of the hoppers in which they are mounted, and the projecting portions carry sprocket-wheels 7 and 8, respectively. Extending downwardly from the rear end of the frame 1 are the spaced hangers 9, between the lower end portion of which is mounted a roller 10, arranged on an axle 11. A sprocket 12 is affixed to the axle 11 to rotate therewith, and a sprocket-chain 13 passes about the sprockets 7, 8, and 12 to impart simultaneous movement to the dropping mechanism of the hoppers 2 and 3. In the hopper 2 is also located a suitable agitator, such as commonly provided, which agitates the contents of the seed-receptacle in an obvious way, preventing clogging of the dropping mechanism. The agitator embodies a number of rotating arms 15, carried by a shaft 16, also projecting from a side of the hopper 2 and carrying a sprocket 17, which is operated by the sprocket-chain 13, above mentioned. The lower lag of the chain 13 is supported by an idler 18, carried by an arm 19, attached to the frame 1.

The front end of the frame 1 will of course be provided with a suitable draft-attaching device 20, and projecting downwardly from this portion of the frame 1 is the furrow-opener 21, the lower end of which is bifurcated, as shown at 22, in order to open the furrow in which the seed and fertilizer are to be dropped. The fertilizer passes to the furrow through a tube 23, extending from the hopper 3 downwardly and terminating at its lower end adjacent to the bifurcated portions of the furrow-opener 21.

The lower end of the tube 23 is bifurcated, as shown at 24, the bifurcate parts being attached to the similar parts 22 of the furrow-opener to effect a substantial construction and mounting of these elements of the mechanism. In rear of the tube 23 are spaced bars 25, secured at their upper end to the frame 1 and converging toward their lower ends so as to meet. The lower ends of the bars 25 are attached together, and each bar is formed with a rearwardly and outwardly projecting wing 26, designed to form a smoother for the opposite sides of the furrow as the furrow is opened by means of the opener 21. The parts 25 are braced by braces 26', which extend from the hangers 9, being attached at the rear ends to the latter. The arrangement of the braces 26' is advantageous, in that the hangers firmly reinforce the braces against longitudinal stress incident to the action of the members 26 in smoothing off the furrow as the implement is advanced over a field. The seed in the hopper 2 is dropped to the ground in rear of the wings 26, and the furrow is closed over such seed and the fertilizer previously deposited in the furrow by means of furrow-closers 27. The furrow-closers are suitably attached at their upper ends to the frame 1, and their lower ends converge in the customary way and effectively perform the function for which they are provided.

The operation of the implement is obvious, and it will be apparent that the arrangement of the parts is advantageous for various reasons. The furrow-closers 27 operate in advance of the roller 10, which is the usual wooden roller, designed to pack the furrow after the fertilizer and seed have been deposited therein. A regulating-slide 28 is adapted to move transversely across the upper end of the tube 23 to determine the amount of fertilizer passing from the hopper 3, and said regulating-slide 28 will be operated by means of a lever 29, the position of which may be fixed by a catch 30 in effecting the desired adjustment of the part 29.

Having thus described the invention, what is claimed as new is—

1. In an implement of the class described, the combination of a supporting-frame, a hopper mounted thereon, dropping mechanism for the hopper, a roller mounted at the rear portion of the frame, means connecting said roller with the dropping mechanism of the hopper to actuate the latter, a furrow-opener connected with the front portion of said frame, a furrow-smoothing device arranged in rear of the furrow-opener, and furrow-closing mechanism disposed in rear of the furrow-smoothing device and operating in advance of the roller aforesaid.

2. In an implement of the class described, the combination of a supporting-frame, a hopper mounted thereon, dropping mechanism for the hopper, a roller mounted at the rear portion of the frame, means connecting said roller with the dropping mechanism of the hopper to actuate the latter, a furrow-opener connected with the front portion of said frame, a furrow-smoothing device arranged in rear of the furrow-opener, and comprising bars attached to the frame and converging to a point of meeting near the lower ends thereof, wings projecting rearwardly and outwardly from said bars, and furrow-closing mechanism disposed in rear of the furrow-smoothing device and operating in advance of the roller aforesaid.

3. In an implement of the class described, the combination of a frame, a hopper disposed thereon, dropping mechanism for the hopper, hangers connected with and projecting outwardly from the rear end of the frame, a roller mounted in said hangers, means for actuating the dropping mechanism operated by the roller aforesaid, a furrow-opener located at the front of the frame, a furrow-smoothing device in rear of said opener and consisting of separate bars connected at their upper ends with the frame and meeting at their lower ends, wings projecting rearwardly from the bars to smooth the furrow, braces connected with the hangers of the roller at one end and connected with the lower portions of the bars aforesaid at the opposite end, and furrow-closers supported by the frame in rear of the furrow-smoothing device and operating in advance of the roller.

4. In an implement of the class described, the combination of a supporting-frame, a seed-hopper on the rear portion of said frame, an agitating device arranged in said hopper, dropping mechanism in said hopper, hangers extending downwardly from the rear end of the frame, a roller journaled in said hangers, shafts for the agitator and the dropping mechanism aforesaid and projecting laterally from the hopper, sprocket-wheels applied to the projecting portions of the shafts above mentioned and to the axle of the roller, a sprocket-chain connecting the several sprockets for simultaneous operation, an idler supporting said sprocket-chain, an arm applied to the frame of the implement and supporting said idler, a furrow-opener depending from the front of the frame, a fertilizer-tube leading downwardly from the fertilizer-hopper and connected at its lower end with the furrow-opener, a furrow-smoothing device in rear of the furrow-opener and tube aforesaid and comprising separate bars connected at their upper ends with the frame of the implement and meeting at their lower ends, wings extending rearwardly and outwardly from the lower ends of said bars, independent braces connecting the hangers of the roller with the bars at the points of meeting of the latter, and furrow-closers supported by the frame of the implement and operating in advance of the roller some distance in rear of the wings aforesaid.

In testimony whereof I affix my signature in presence of two witnesses.

THOMAS M. LEDBETTER. [L. S.]

Witnesses:
 PRESTON A. LEDBETTER,
 JOHN M. POOL.